Patented May 25, 1937

2,081,160

UNITED STATES PATENT OFFICE 2,081,160

METHOD AND MATERIAL FOR COATING METAL

Robert R. Tanner, Highland Park, Mich., assignor to Metal Finishing Research Corporation, Detroit, Mich., a corporation of Michigan No Drawing. Application April 25, 1932, Serial No. 607,511. Renewed August 7, 1936

12 Claims. (Cl. 148—6)

This invention relates to a method and material for coating metal. More particularly it relates to a method and material whereby metal may be provided substantially simultaneously with a substantially integral coating of salt of the metal and a finish coat which is firmly bonded by the salt coating to the metal.

The object of the invention is to make possible the application of an applied coat to metal and have this coat adhere firmly without the necessity of a separate preliminary treatment before the application of the finishing coat.

It is well known that difficulty is sometimes encountered in obtaining satisfactory adherence to bare metal of paint, lacquer, japan, varnish, enamel, and other applied coats which are desirable for the protection of the surface of the metal and for imparting the desired appearance thereto. Particularly where the surface of the metal is subject to corrosion, any pin pricks or scratches breaking the continuity of the protective coat expose the surface of the metal to corrosion, and the corrosion spreads beneath the protective coat so that the coat becomes still less adherent to the metal. For these reasons much trouble has been encountered in providing metal with a permanent applied coat.

By "applied coat" is meant a film produced upon the surface of the metal by solidification of materials applied thereto in a liquid substantially free from water, as distinguished from a coat formed by chemical reaction, said reaction being largely with the metal to form with the metal of the surface a substantially insoluble salt.

It is known that many metals may be provided with substantially integral coats of salts of the metals by treatment with proper chemicals. For example, the treatment of iron and steel surfaces by dilute phosphate solutions, to produce upon the surfaces coatings of phosphates of iron, has been widely practiced, and such a phosphate coating forms an excellent bond for various types of applied coats. By the use of proper chemicals, similar coats may be produced upon zinc and magnesium, and by other chemicals somewhat analogous coats may be produced upon aluminum and other metals. For brevity, such coats will be referred to hereinafter as chemical coats.

The present invention consists essentially in combining with the materials for an applied coat, chemicals which will react with the metal surface and produce a chemical coat upon the surface of the metal, which chemical coat performs the same function as the phosphate bonding coat mentioned above with respect to steel where that is used as a foundation for the applied coat.

Several examples of such combinations will be given, and the descriptions in connection therewith will make clear the principles of the invention and the manner in which it may be generally applied.

One satisfactory combination comprises drying oil, or a paint containing drying oil and/or resin in its vehicle, chemicals for forming a chemical coat upon the metal, and a common solvent of the oil and/or resin and the chemicals. The solvent for the chemicals should form a solution with the oil or form a sufficiently complete emulsion so that the chemicals will contact substantially the entire surface to which the emulsion is applied. In the subsequent description, for purposes of brevity, the term "solution" is employed to cover, not only a technical solution, but an emulsion or other mixture which accomplishes the result of thorough and substantially even distribution of the various ingredients throughout the mass of the mixture.

One example of a solvent and chemicals to be used therewith for coating surfaces of iron and steel may be composed as follows: Butyl alcohol substantially saturated with zinc di-hydrogen phosphate or manganese di-hydrogen phosphate and copper and manganese nitrates. These chemicals are sufficiently soluble in butyl alcohol so that, when mixed with linseed oil or other drying oil, with or without pigments, they will readily produce a chemical coat upon iron or steel, to which chemical coat the drying oil adheres satisfactorily. Considerable variation may be introduced in the proportions of the ingredients, depending upon the exact nature of the metal to be treated, the nature and purpose of the applied coat and the manner of and facilities for applying the coat. One proportion which gives good results is as follows: Linseed oil 50 parts, butyl alcohol 50 parts, saturated with zinc di-hydrogen phosphate, copper nitrate and manganese nitrate. These materials, thoroughly mixed together and applied to a surface of iron or steel, produce a chemical coat thereon immediately upon application, and a very adherent applied film forms when the material dries. This may be accomplished in about one hour by heating to 450° F. The temperature may be lowered or the time decreased with use of different kinds or amounts of driers, where preferred. A mixture may be used in a similar manner which dries at ordinary temperatures, given sufficient time. The drying, whether at ordinary temperatures or at elevated temperatures, is independent of the formation of the chemical coat, since that forms promptly and while the material is in a substantially liquid form.

By adding to the same mixture mentioned above a pigment or filler in an amount such as usually employed in a surfacer, a material is formed which not only produces and adherent film, but also fills in cracks or scratches and consequently may act as a surfacer, if applied to an automobile body or the like. A metal surface treated in this way will withstand adverse conditions much longer than will absolutely clean metal having applied thereto a similar coat omitting the phosphate and nitrates. For example, test panels coated in the two ways were subjected to salt spray and the panels with the phosphate and nitrates in the coating material satisfactorily withstood the salt spray many times as long as the panels treated in the same way except for the omission of the phosphate and nitrates. Similarly, if the two kinds of coatings are scratched and thereafter exposed to corroding influence, such as a salt spray, the metal is corroded underneath the film of protecting material at the sides of the scratch where the phosphate and nitrates are not used, but where the phosphate and nitrates are used, the corrosion is confined to the surface of the metal laid bare by the scratch.

The same solution of chemicals may be added to a paint containing natural or synthetic resin in addition to or in place of drying oil, and to pyroxylin and/or cellulose acetate paints or lacquers, but with the latter the addition of acetate to increase solubility is desirable. Butyl acetate, amyl acetate and other solvents may be used. In general, any solvent for the chemicals may be used that will sufficiently disperse the chemicals through the paint and which will ionize the chemicals sufficiently to insure their proper reaction with the metal treated.

Another composition which may be employed to advantage is a mixture of oxalic acid and manganous nitrate, dissolved in an ingredient of the applied coat. The proportion of oxalic acid to manganous nitrate may vary considerably owing to varying conditions, but the most satisfactory proportions are those obtained when the ingredients are dissolved until the solvent is saturated. Sufficient will dissolve in the solvents commonly employed in nitro-cellulose or cellulose acetate paints or lacquers, to produce a chemical coat upon the surface of iron, steel or zinc if a very small amount of water is present, to secure ionization. When used on zinc, nitrate of iron instead of manganese may be used to advantage. Heating of the applied film is sometimes desirable to increase the chemical coating action.

It will be readily understood that other chemicals may be employed than those mentioned above, providing they are used in proportions which will produce a satisfactory chemical coat upon the metal in the quantities in which they can be dissolved in the coating material without detriment to the applied coat. Also, it is preferable to employ a combination of chemicals which will reduce the formation of gas during the reaction on the metal to a minimum, in order to avoid bubbles in the applied coat. In the examples given, the presence of the nitrate in the solution reduces the amount of hydrogen which would otherwise be released during the reaction and at the same time expedites the reaction. Neither zinc di-hydrogen phosphate nor manganous di-hydrogen phosphate without some accelerator reacts with an iron or steel surface with sufficient promptness to be satisfactory in such a mixture as indicated above. Likewise oxalic acid in a paint composition does not produce any chemical coat unless ionized and accelerated.

One convenient way of employing the invention is to mix the chemicals and solvent for the chemicals with a thinner, such as is customarily employed with applied coats. The same thinner may be employed with many different kinds and colors of applied coats comprising linseed oil or similar drying oils or resins, while another kind of thinner may be prepared for general use with pyroxylin paints and the like. A thinner of each class may be prepared for each of the different classes of metals to be painted. In this way a comparatively few different thinners may be used with a great number of kinds and colors of paints and lacquers suitable for application to different metals and under widely different conditions.

In the foregoing paragraph, the term "thinner" is employed to cover a mixture of solvent and diluent materials such as commonly employed for thinning paints; but it will be understood that the nature and amount of the solvent for chemicals and its effect upon the paint must be considered, and the nature and proportions of the materials of the thinner must be chosen so as to secure the proper working qualities in the paint.

While a few definite examples of compositions have been given and a number of variations indicated, it will be understood that other variations are possible within the scope of the appended claims.

What I claim as new and desire to secure by Letters Patent is:

1. The method of coating metal which consists in applying thereto a liquid coating composition containing applied-coating materials that will dry down to form a substantially continuous adherent film, organic liquid, dissolved acidic material, of the class that unites with the metal of the surface to form a substantially insoluble salt of the metal with the evolution of hydrogen, and an oxidizing agent, forming a chemical coating on the metal by the action of said acidic material thereon, substantially eliminating bubbles by the action of said oxidizing agent, and thereafter drying said applied-coating material into a film adhering to said chemical coating.

2. A composition of matter comprising an organic liquid thinner for an applied coating composition of the class consisting of drying-oil paints, resin paints and varnishes and pyroxylin and cellulose acetate paints, dissolved acidic material of the class consisting of dihydrogen phosphates and oxalic acid, and a dissolved accelerator of the class consisting of oxidizing agents and compounds of metals below zinc in the electromotive series.

3. A composition of matter comprising an organic liquid thinner for an applied coating composition of the class consisting of drying-oil paints, resin paints and varnishes and pyroxylin and cellulose acetate paints, dissolved dihydrogen phosphate and dissolved nitrate.

4. A composition of matter comprising an organic liquid thinner for an applied coating composition of the class consisting of drying-oil paints, resin paints and varnishes and pyroxylin and cellulose acetate paints, dissolved dihydrogen phosphate and a dissolved compound of copper.

5. A composition of matter comprising an organic liquid thinner for an applied coating composition of the class consisting of drying-oil paints, resin paints and varnishes and pyroxylin and cellulose acetate paints, dissolved oxalic acid and an oxidizing agent.

6. A composition of matter comprising a thinner for a liquid applied-coating composition having dissolved therein material including the $PO_4$ radical in condition to react with a metal surface and release hydrogen, and an oxidizing agent in proportion to combine with the hydrogen and substantially eliminate bubbles.

7. A composition of matter comprising a paint vehicle of the group consisting of drying oils and resin, a heavy alcohol, dihydrogen phosphate, and a chemical-coating accelerator dissolved in said alcohol, said accelerator being of the class consisting of oxidizing agents and soluble compounds of copper.

8. A composition of matter comprising an organic liquid paint vehicle of the group consisting of drying oils and resins, butyl alcohol, and zinc di-hydrogen phosphate and copper and manganese nitrates dissolved in said alcohol.

9. A composition of matter comprising a cellulose lacquer, a solvent comprising an acetate, and acid phosphates and nitrates for producing a chemical coat upon metal.

10. A composition of matter comprising an organic liquid thinner for a liquid applied-coating composition, said thinner containing dissolved acidic material adapted to form a paint-holding salt on the surface of metal with the evolution of hydrogen, and an oxidizing agent in proportion to substantially eliminate bubbles of the released hydrogen in the coating.

11. A composition of matter comprising a thinner for a liquid applied-coating composition, said thinner containing dissolved oxalic acid and an oxidizing compound of a metal of the group consisting of manganese and iron.

12. A composition of matter comprising a thinner for a liquid applied-coating composition, said thinner containing dissolved oxalic acid and manganese nitrate.

R. R. TANNER.